INVENTOR
Alec Hervey Bennett Walker.
BY
HIS ATTORNEY

Patented Nov. 1, 1949

2,486,768

UNITED STATES PATENT OFFICE 2,486,768

ALTERNATING ELECTRIC CURRENT RECTIFYING APPARATUS OF THE DRY SURFACE CONTACT TYPE

Alec Hervey Bennett Walker, London, England, assignor, by mesne assignments, to The Union Switch and Signal Company, Swissvale, Pa., a corporation of Pennsylvania Application August 14, 1945, Serial No. 610,758
In Great Britain November 20, 1944

1 Claim. (Cl. 175—366)

This invention relates to alternating electric current rectifying apparatus of the dry surface contact type such as the well-known copper oxide and selenium rectifiers of the kind comprising one or more stacks or columns of rectifying elements and has for its object to provide an improved construction of apparatus of this character.

The invention is particularly although not exclusively applicable to rectifying devices utilized in radio apparatus of the so-called "mains" type in which the various tube circuits of the apparatus are arranged to be supplied with unidirectional current or voltage usually derived from an alternating current supply circuit by means of a rectifier tube, the improved device of the invention being adapted to take the place of a tube of this character.

In the improved construction of the invention each of the stacks or columns of rectifier elements is provided as is usual with cooling members or fins interposed at suitable intervals in the stack or column and either separate from or constituting extensions or parts of the rectifying elements.

According to the invention these cooling members are so formed that the portions thereof projecting beyond the periphery of the stack or column are inclined to the axis of the latter so as to induce or permit the flow of cooling air currents over the members and the stack or column by convection and thus effectively dissipate the heat generated in the rectifier elements.

The invention is more particularly applicable to stacks or columns of rectifiers having their axes vertical and in carrying the invention into practice as thus applied the planes of the cooling members are suitably inclined to the horizontal either at a constant or varying angle so as to provide, in the region immediately surrounding the peripheral surface of the stack or column, a number of vertically superposed parallel paths or guide channels for the flow of the surrounding air or one or more ascending helical paths or channels for the same purpose.

I shall describe three forms of devices embodying my invention, and shall then point out the novel features thereof in the claim.

Figure 1:
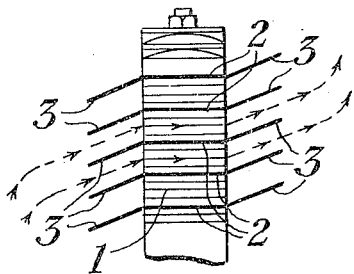
Figure 3:
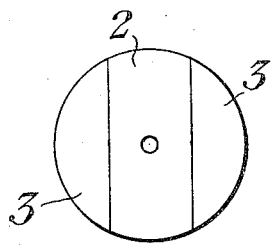
Figure 5:
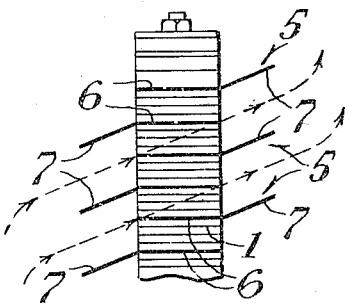
Figure 2:
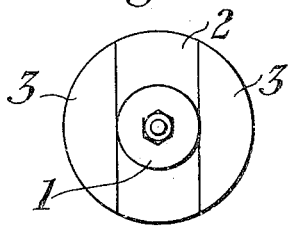
Figure 4:
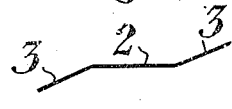
Figure 6:
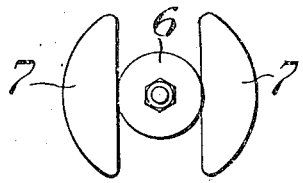
Figure 7:
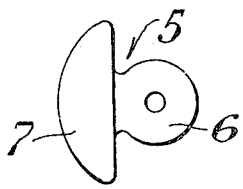
Figure 9:
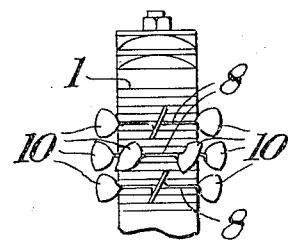
Figure 8:
Figure 10:
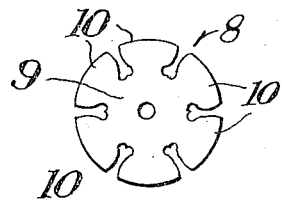

In the accompanying drawings Figure 1 is a somewhat diagrammatic view in vertical section showing one form of device embodying my invention, Figure 2 being a top plan view of the device shown in Figure 1. Figures 3 and 4 are views in plan and elevation respectively of a single cooling member utilised in the device of Figures 1 and 2. Figures 5 and 6 are views similar to Figures 1 and 2 respectively showing another form of device embodying my invention, Figures 7 and 8 being views corresponding respectively to Figures 3 and 4 of the cooling member utilised in the device of Figures 5 and 6. Figure 9 is a view similar to Figure 1 showing a still further form of device embodying my invention, Figure 10 being a top plan view of a single cooling member utilised in the device of Figure 9.

Similar reference characters refer to similar parts in each of the several views.

In order that the nature of the invention may be clearly understood a construction embodying the invention and adapted to form a rectifier tube replacement or power unit for radio receiving apparatus will now be briefly described by way of example.

The device as shown in Figures 1 and 2 comprises a base of the usual tube type not shown having contact pins, or plugs at its lower end and a rod or spindle secured to the base at the other end.

Mounted on the rod or spindle is a stack or column of rectifier elements I. These rectifier elements may be of any of the dry surface contact types, but are preferably of the well-known selenium type and each consists of a base member of sheet steel or the like coated on one face with a selenium composition to which a counter-electrode layer of suitable metal is applied.

Interposed at suitable intervals in the stack or column is a number of cooling members 2 composed of sheet metal, each being of elliptical form, the portions of the member 2 at the sides of the central zone being bent upwards and downwards respectively as shown at 3 in Figures 3 and 4 at a suitable angle so that the cooling member 2 is as a whole substantially circular in plan.

The side portions 3 of each cooling member 2 extending beyond the central zone thus constitute guide channels for the flow of cooling air, the currents of which impinge on the peripheral surface of the section of the stack or column I between adjacent cooling members 2 at an angle and assist the cooling action to a considerable extent.

In an alternative construction shown in Figures 5 and 6 each cooling member is designated by the reference character 5, and consists of a substantially circular portion 6 of approximately the size and shape of a rectifier disc with a segmental projecting portion 7 bent at an angle to the circular portion 6 on one side of the circular portion 6, this construction having the advantage that the paths of the air currents between adjacent cooling members 5 are substantially straight.

In a still further modified construction shown in Figure 9 each of the cooling members is designated by the reference character 8, and consists of a central portion 9 similar to a rectifier disc in size and shape with a plurality of equally spaced blades or vanes 10 projecting from the central portion 9, the plane of each blade or vane portion being inclined at an angle to the plane of the central portion 9 so as to provide one or more helical guide channels between adjacent cooling members 8.

The contact pins, or plugs on the base of the device are electrically connected by a wire or connector to the rectifier discs at each end so as to provide the necessary external connections to the stack 1, or if desired the stack may be subdivided into separate sections each connected to contact pins or plugs so as to enable well-known systems of connections of the rectifier discs to be employed.

The stack or column 1 with its spaced interposed cooling members may be surrounded if desired by a perforated outer casing (not shown) of substantially cylindrical form so as to provide a compact structure of approximately the size and shape of a rectifier valve which the device is intended to replace.

The device is preferably designed to be installed with the axis of the rectifier stack or column substantially vertical but may obviously be arranged otherwise, with the axis of the stack horizontal for example.

Although I have herein shown and described only a few forms of devices embodying my invention, it is understood that various changes and modifications may be made therein within the scope of the appended claim without departing from the spirit and scope of my invention.

Having thus described my invention, what I claim is:

In combination, a stack of rectifier elements having a vertical axis, and cooling fins interposed in said stack, each said fin being of elliptical form and having portions at the sides of the central zone bent upwards and downwards respectively at a suitable angle so that the cooling member is as a whole substantially circular in plan.

ALEC HERVEY BENNETT WALKER.

REFERENCES CITED

The following references are of record in the file of this patent:

UNITED STATES PATENTS

| Number | Name | Date |
|---|---|---|
| 1,216,605 | Parzel | Feb. 20, 1917 |
| 1,715,518 | Schmidt | June 4, 1929 |
| 2,083,647 | Gilson | June 15, 1937 |
| 2,169,109 | Muller | Aug. 8, 1939 |